Figures 1, 2:
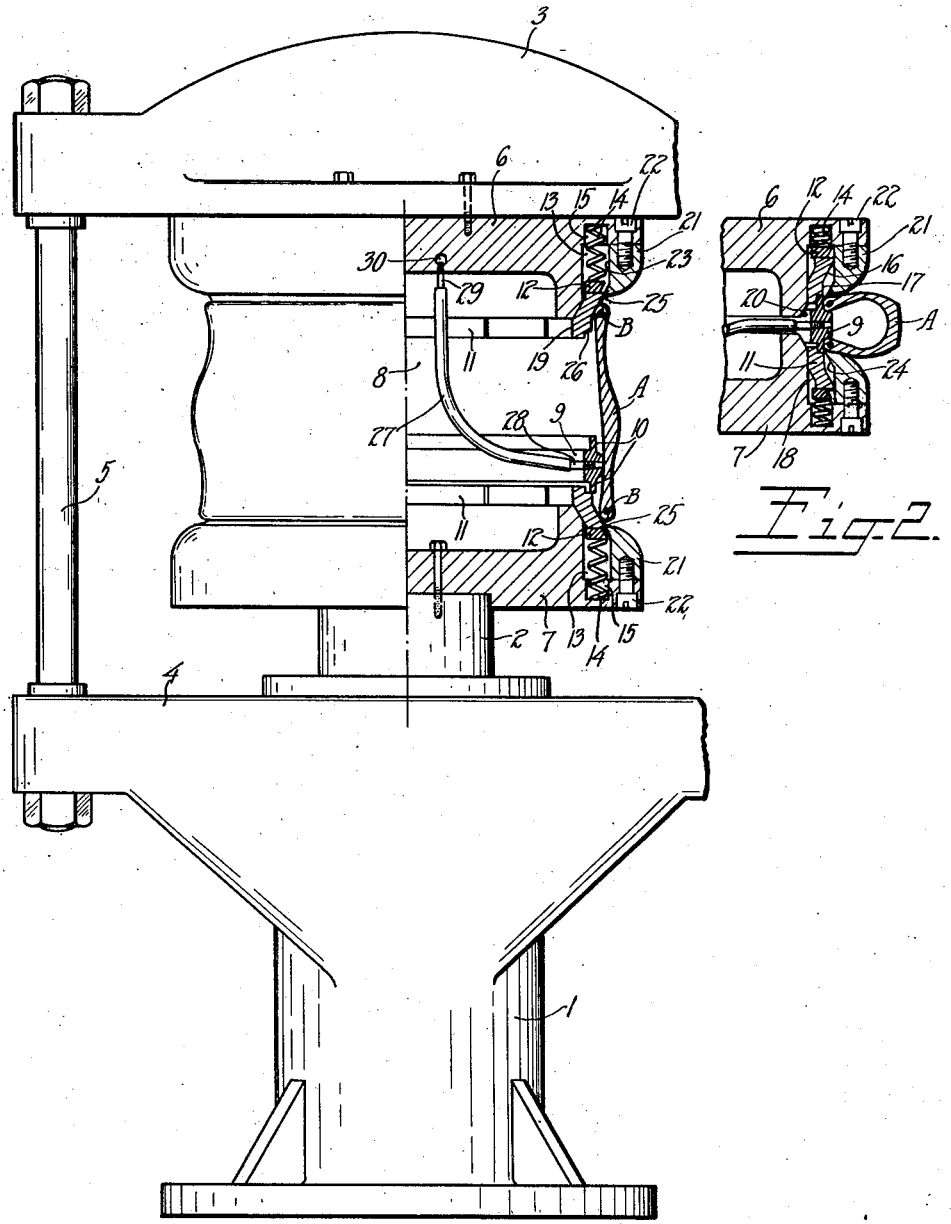

Dec. 1, 1925.

A. OTTO 1,563,519

APPARATUS FOR MANUFACTURING TIRE CASINGS

Filed March 6, 1924

INVENTOR
ALBERT OTTO
BY
HIS ATTORNEY

Patented Dec. 1, 1925.

1,563,519

UNITED STATES PATENT OFFICE.

ALBERT OTTO, OF DETROIT, MICHIGAN, ASSIGNOR TO MORGAN & WRIGHT, OF DETROIT, MICHIGAN, A CORPORATION OF MICHIGAN.

APPARATUS FOR MANUFACTURING TIRE CASINGS.

Application filed March 6, 1924. Serial No. 697,178.

*To all whom it may concern:*

Be it known that I, ALBERT OTTO, a citizen of the United States, residing at Detroit, county of Wayne, and State of Michigan, have invented a certain new and useful Apparatus for Manufacturing Tire Casings, of which the following is a full, clear, and exact description.

This invention relates to an apparatus for manufacturing tire casings for motor vehicles, and more particularly to the shaping of endless band structures into tire form.

An object of the invention is to mount the band upon a bull ring while in the shaping apparatus after it has been substantially shaped to tire form so that it may be removed from the apparatus in its supported position upon the ring and subjected to further treatment if desired and finally vulcanized in the usual tire molds or otherwise as desired.

Another object of the invention is to provide yielding supports for the edges of the band which cooperate with pusher rings, to seal the edges to provide a chamber for the retention of the fluid under the desired pressure to produce the distension of the band; to facilitate the distension of the band; and to facilitate the turning of the band edges from the flat state to tire form.

A further object is to provide a chamber for the retention of the fluid for the initial distension of the band and means for subsequently sealing the bull ring to the edges of the band to produce a second chamber for the retention of the fluid employed in distending the band throughout its final shaping to approximate tire form in the apparatus.

Referring to the drawing forming a part of this specification,

Fig. 1 is a front elevation partly in section of an apparatus involving the present invention showing the parts and an endless band in their initial positions; and Fig. 2 is a fragmental view similar to Fig. 1 showing the parts in their final positions with the band distended approximately to tire shape and mounted on the bull ring ready for removal therewith.

The present invention relates to the manufacture of tire casings for motor vehicles from a flat endless band. The bands are made in various ways and may contain all the component parts comprising a tire casing or only a portion of the parts, the remainder, such for instance as the tread, etc., being incorporated at some later stage in the manufacture. Therefore when reference is made to an endless band structure or similar terms it will be understood that it is intended to refer to an assemblage of all or any number of the parts employed in the manufacture of tire casings. When the term flat endless band is employed it will be understood to refer to a band that has not been brought to part tire shape although it need not be perfectly flat in cross-section, but may be more or less curved, or otherwise shaped.

In the present instance a substantially flat band A is shown with wire bead rings B in each of its edge portions. To shape the band to tire form the central portion must be distended radially outwardly and the edges relatively moved toward each other. The distension of the band in the present instance is accomplished by subjecting the inner surface of the band to the direct action of a fluid under pressure. To relatively move the edges toward each other the apparatus is constructed in the main similar to the usual types of hydraulic presses and comprises a cylinder 1 forming the base of the apparatus, a ram 2 extending from the cylinder and raised by hydraulic pressure produced in the cylinder and lowered by gravity in the usual manner. The head 3 of the press is secured to the base plate 4 by means of tire rods 5.

To distend the endless band, a chamber for the distending fluid is formed by providing sealing means for sealing the band at its edges, the inner surface of the band constituting a wall of the chamber. In the present instance platens 6 and 7 are provided, the former being bolted to the head 3, and the latter being bolted to the ram 2, to form closures for the entire top and bottom of the band thereby providing a chamber 8 including the entire interior volume of the band.

The bull ring 9 upon which the band is supported after having been shaped to substantially tire form may be of any desired construction and is placed in the chamber 8. To provide for one of the before-mentioned features of the invention, whereby the band is mounted on the bull ring, the ring is provided with two side flanges 10—10 for supporting the edges of the shaped band thereupon as clearly seen in Figure 2.

Another feature of the invention, namely, that of the yielding support for the band edges, is accomplished in the preferred embodiment by providing sectional supporting rings 11—11, the sections of which are supported upon rings 12 within annular channels 13 formed in the platens or closures 6—7. The rings 12 are mounted on a series of spaced springs 14, housed in sockets 15 formed in the channels 13 which operate to hold the sectional rings 11 in their extended positions and to yieldingly resist any tendency to force the rings radially outward into the channels.

The sectional rings 11 are provided with the outwardly flaring or conical faces 16 upon which the edges of the band are initially supported, and the cylindrical faces 17 upon which the band edges are later supported as will presently more fully appear. The rear walls of the rings 11 are likewise formed of conical faces 18 and cylindrical faces 19. The rings are thus composed of conical portions and cylindrical portions. The closures 6 and 7 are provided with the conical faces 20 which coact with the faces 18 to support the sectional rings and to cause the sections to initially move radially outward as they are moved axially outward.

Rings 21 are secured to the platens 6 and 7 by means of the screws 22. The inner faces of the rings form part of the walls of the channels 13 and are composed of cylindrical faces 23, and conical faces 24 for engaging the conical faces 16 which serve to hold the sectional rings 11 within the channels. These rings 21 are made detachable in order that the channel may be opened to receive the sectional rings 11 when the parts are assembled. The rings 21 serve as pusher rings for engaging and relatively moving or pushing the band edges toward each other. They are preferably rounded at their outer faces and meet the conical faces 24 to provide the toes 25 which cooperate with the sectional rings to form seals for the band edges as will later more fully appear. It will thus be seen that the construction just described provides a yielding support for the band edges, the several parts cooperating to seal the band at its edge portions, and by the yielding engagement to facilitate the distension of the band, and the turning of the band edges from the flat state to tire form. Also by the sealing of the band at the edges the fluid is retained under the required pressure in the chamber to produce the distension of the band desired.

In the present embodiment, where the bull ring is provided with the flanges 10, the cylindrical faces 17 are provided with the shoulders 26 which engage these flanges as the supporting rings are relatively moved toward each other, thereby providing a seal between the bull ring and the band edges to produce a second chamber for retaining the fluid employed in distending the band throughout the final formation given it while in the apparatus. As the platens 6 and 7 are brought toward each other the volume of the chamber between them and the band obviously decreases thereby causing a pressure of the fluid contained therein which will be exerted directly against the inner surface of the band tending to distend same. The amount of pressure thus created will obviously depend upon the change in volume of the chamber. However, in the preferred embodiment independent means are also provided for introducing fluid to the chamber and to this end a flexible conduit 27 is detachably connected at one end to a nipple 28 extending through the bull ring and at the other end to a nipple 29 which is connected to an orifice 30 formed in the platen 6 which may be connected with any source of compressed fluid supply desired as for instance compressed carbon dioxide or nitrogen.

The operation of the apparatus is as follows: The platens 6 and 7 are sufficiently spaced to permit the endless band A to be placed therebetween, with the bull ring placed on the interior of the band, the sectional rings 11 being in their full extended positions. The ram 2 is then moved upward by the hydraulic pressure in the cylinder 1 until the parts assume the positions substantially as shown in Figure 1. The compressed fluid may then be admitted to the chamber through the nipple 28 in the bull ring and the ram further raised. The operation of the ram and the admission of the distending fluid into the chamber are at all times under the control of the operator and by a proper manipulation the edges of the band may be relatively moved toward each other and the band distended in a manner best suited to produce the required approximate tire shape of the band.

Presuming the pressure of the fluid to be controlled in the most efficient manner during the relative movement of the edges of the band toward each other, attention will be directed to the operation of the parts resulting in this movement of the edges. As the ram is gradually moved upwardly the edges of the band first come into contact with the toes of the pusher rings 21, the sectional rings 11 being capable of yielding or moving if occasion so requires with the movement of the band edges toward the pusher rings. During this movement the band edges are moving so to speak up the outwardly flaring faces 16 to larger circumferences and are accordingly being stretched and pressed tightly against the sectional rings. When they are moved sufficiently to engage the toes of the pusher rings, the pusher rings, sectional rings, and band edges cooperate to produce a seal to more completely enclose the fluid within the chamber 8..

The platen 7 and its attendant parts in their continued movement are brought continually nearer to the platen 6 and its attendant parts and consequently the band edges are brought continually closer together as the band is being gradually distended by the pressure of the fluid introduced through the conduit 23, until finally the flanges 10—10 on the bull ring 9 engage the shouldered portions of the sectional rings 11 thereby arresting the movement of these rings. The joints thus formed by the sectional rings engaging the bull ring flanges produce a seal between the bull ring and the band edges thereby constituting a second fluid chamber between the bull ring, sectional flanges, and partially inflated band, into which the fluid supplied through the nipple 28 is introduced to produce the final formation of the band into approximate tire shape as shown in Figure 2. The movement of the sectional rings being arrested, a further relative movement of the platens as the ram 2 is moved further upward results in producing a relative movement between the platens and sectional rings, and between the band edges and sectional rings, the sectional rings being forced into their retaining channels. There is likewise a relative movement between the edges of the band and the bull ring the band edges being continually under the pushing influence of the toes of the pusher rings 21. These relative movements result in the sectional rings being retracted within their channels by a relative movement initially radially and axially outward from the band until the conical faces 18 pass the conical faces 20, and finally in an outward radial direction only. Simultaneously with the retraction of the sectional rings the pusher rings operate to force the band edges from the conical faces to the cylindrical faces of the sectional rings at which time the band has assumed approximate tire shape and finally the pusher rings force the band edges upon the flanges 10 of the bull ring 9 as clearly shown in Figure 2. The band may then be subjected to a further application of the pressure of the fluid, or the pressure may be released to any desired extent. Finally, the platen 7 is lowered a sufficient distance to withdraw the bull ring and the shaped band supported thereon. They are thus removed together from the apparatus for further treatment of the band if desired as for instance where the band is only partially built other parts may be incorporated. After the tire casing is completely formed it is finally vulcanized within tire molds or otherwise as desired.

As many apparently widely different embodiments of this invention may be made without departing from the spirit thereof, it will be understood that I do not intend to limit myself to the specific embodiment herein set forth except as indicated in the appended claims.

Having thus described my invention what I claim and desire to protect by Letters Patent is:

1. An apparatus for shaping endless band structures into tire form comprising a bull ring for engaging the band after shaping, yielding supports for the edges of the band, means for pushing the band edges and for cooperating with the yielding supports for sealing the edges of the band to form a fluid-retaining chamber containing the ring the inner surface of the band constituting a wall of the chamber, means for applying the pressure of the fluid in the chamber to the band for distending it, and means for operating the yielding supports and pushing means for relatively moving the band edges and the supports toward each other and for further moving the edges relatively to their supports until they are engaged by the said bull ring.

2. An apparatus for shaping endless band structures into tire form comprising a bull ring, means cooperating with the band to form a fluid-retaining chamber containing the bull ring the inner face of the band constituting a wall thereof, rings yieldingly supported by said means for supporting the band edges, rings carried by said means for pushing said edges, said supporting and pusher rings cooperating to seal the band at the edge portions thereof with said means in the formation of said chamber, means for applying the pressure of the fluid in the chamber to the band for distending it, and means for operating the pusher rings and yielding rings for relatively moving the band edges with the yielding rings toward each other and for further moving the edges relatively to the yielding rings until the edges are engaged by the said bull ring.

3. An apparatus for shaping endless band structures into tire form comprising a bull ring for engaging the band after shaping, a closure for entirely enclosing each end of the band to form a fluid-retaining chamber containing the ring the inner surface of the band constituting a wall thereof, rings yieldably supported in the closures for yieldingly supporting the band edges, rings supported by the closures for pushing the band edges, said supporting and pusher rings cooperating to seal the band at the edge portions thereof with said closures in the formation of said chamber, means for applying the pressure of the fluid in the chamber to the band for distending it, and means for operating the pusher rings and yielding rings for relatively moving the band edges with the yielding rings toward each other and for further moving the edges relatively to the yielding rings until the edges are engaged by the said bull ring.

4. An apparatus for shaping endless band structures into tire form comprising a bull ring for engaging the band after shaping, means cooperating with the band to form a fluid-retaining chamber containing the bull ring the inner surface of the band constituting a wall thereof, rings yieldingly supported by said means for supporting the band edges, rings carried by said means for pushing said edges, said supporting and pusher rings cooperating to seal the band at the edge portions thereof with said means in the formation of said chamber, means for applying the pressure of the fluid in the chamber to the band for distending it, and means for operating the pusher rings and yielding rings for relatively moving the band edges with the yielding rings toward each other until the yielding rings engage the bull ring to arrest their movement and to permit relative movement between said yielding rings and pusher rings and band edges whereby the edges are brought into engagement with the bull ring.

5. An apparatus for shaping endless band structures into tire form comprising a bull ring for engaging the band after shaping, closures for entirely enclosing each end of the band to form a fluid-retaining chamber containing the ring the inner face of the band constituting a wall thereof, sectional rings, means for yieldingly supporting said rings in the closures whereby the rings will yieldingly-support the band edges, rings-supported by the closures for pushing the band edges, said supporting and pusher rings co-operating to seal the band at the edge portions thereof with said closures in the formation of said chamber, means for applying the pressure of the fluid in the chamber to the band for distending it, and means for operating the pusher rings and yielding rings for relatively moving the band edges with the yielding rings toward each other and for further moving the edges relatively to the yielding rings until the edges are engaged by the said bull ring.

6. An apparatus for shaping endless bands into tire form comprising a bull ring for engaging the band after shaping, closures for entirely enclosing each end of the band to form a fluid-retaining chamber containing the ring the inner face of the band constituting a wall thereof, sectional rings yieldingly supported in the closures to permit relative movement therewith whereby the sections may be moved axially and radially outward from the band said sections having outwardly flaring surfaces for yieldably supporting the band edges thereupon, rings supported by the closures for pushing the band edges, said supporting and pusher rings cooperating to seal the band at the edge portions thereof with said closures in the formation of said chamber, means for applying the pressure of the fluid in the chamber to the band for distending it, and means for operating the pusher rings and yielding rings for relatively moving the band edges with the yielding rings toward each other until the yielding rings engage the bull ring whereupon the further movement of the pusher rings is accompanied with a relative movement of the yielding rings simultaneously initially radially and axially outward from the band, and subsequently in a radial direction only until the band edges are brought into engagement with the bull ring.

7. An apparatus for shaping endless band structures into tire form comprising a bull ring having side flanges for supporting the edge portions of the band thereon after shaping, a closure for each edge of the band to form a chamber containing the ring the inner face of the band constituting a wall thereof, sectional rings yieldingly supported in the closures to permit relative movement therewith whereby the sections may be moved axially and radially outward from the band and having outwardly flaring faces for yieldably supporting the band edges, means for applying the pressure of the fluid in the chamber to the band for distending it, and means for moving the closures and yielding rings with the band edges supported thereon relatively toward each other until the yielding rings engage the bull ring whereupon the further movement of the closures will produce the said relative movement of the yielding rings simultaneously initially radially and axially outward from the band and subsequently in a radial direction only until the band edges are moved upon the flanges of the bull ring.

8. An apparatus for shaping endless band structures into tire form comprising a pair of platens having circular channels formed therein, means for relatively moving the platens, springs housed in spaced relation in sockets formed in said channels, a ring supported upon said springs in each of said channels, sectional band supporting rings supported on said first-mentioned rings, a bull ring between the sectional rings, and means for introducing a fluid under presure between the platens.

9. An apparatus for shaping endless band structures into tire form comprising a pair of platens having circular channels formed therein, means for relatively moving the platens, springs housed in spaced relation in sockets formed in said channels, a ring supported upon said springs in each of said channels, sectional band supporting rings supported on said first-mentioned rings having outwardly flaring conical portions adjacent the said first-mentioned rings and shouldered cylindrical portions on the opposite sides therefrom, the said platens being provided with conical faces for engaging the inner conical faces of the said sectional rings, pusher rings secured to the platens provided with inwardly extending toes for maintaining the sectional rings in their channels, a bull ring having side flanges between the sectional rings for engaging the shoulders formed in the sectional rings, and means for introducing fluid under pressure between the platens.

Signed at Detroit, county of Wayne, State of Michigan, this 28th day of February 1924.

ALBERT OTTO.